Dec. 1, 1964 B. B. SILVERMAN 3,159,413

BRANCH FITTING FOR PIPES

Filed Jan. 24, 1961 2 Sheets-Sheet 1

INVENTOR

BENJAMIN B. SILVERMAN

BY Roy E. Raney

ATTORNEY

Dec. 1, 1964 B. B. SILVERMAN 3,159,413

BRANCH FITTING FOR PIPES

Filed Jan. 24, 1961 2 Sheets-Sheet 2

INVENTOR

BENJAMIN B. SILVERMAN

BY Roy E Raney

ATTORNEY

United States Patent Office 3,159,413

Patented Dec. 1, 1964

3,159,413

BRANCH FITTING FOR PIPES

Benjamin B. Silverman, 219 Buena Vista Drive, Dunedin, Fla.

Filed Jan. 24, 1961, Ser. No. 84,590
1 Claim. (Cl. 285—189)

The present invention relates to an improved structure for readily connecting branch pipes and the like to a main pipe or the like.

The principal object of the present invention is the provision of a joint structure or unit comprising two ring-like sections biasing their axes at an angle to one another at less than 180° and the surfaces of their inner ends lying in a semi-cylindrical section extending through slightly more than 180° so that this section may grip a pipe section embraced thereby to prevent ready disengagement of the unit from the pipe, the semi-cylindrical section being yieldingly flexed to spread the open side to receive a pipe therein, the unit being attached to the pipe so that the ring-like section may receive the ends of the pipes and thereby provide a permanent, strong joint between the pipes. The invention is particularly advantageous in forming a system of main and branch pipes connected with a multitude of growing beds supported individually by the pipes for feeding mineral containing water to plants growing in the beds, and wherein the assembling of the pipe and bed system requires considerable latitude or flexibility in the positioning of the pipes and beds connected therewith for correct and efficient spacing of the individual beds.

Another object of the invention is the provision of a new method of attaching branch pipes to a pipe section or the like, which comprises the steps of providing a connector structure having a pair of angularly spaced ring-like sections joined together by resilient means and the inner surfaces of which lie in a semi-cylindrical section approximately the diameter of the pipe section and extending through slightly more than 180°, the semi-cylindrical section being yieldingly spreadable to receive the pipe section therein and to normaly frictionally grip the section, applying the connector to the pipe section by spreading the semi-cylindrical section to receive the pipe section therein, and then drilling openings through the pipe walls in alignment with the ring-like sections.

Other objects and advantages of the invention will be apparent from the following description of a preferred form thereof, reference being made to the accompanying drawings, wherein FIG. 1 is a fragmentary perspective view of a growing system comprising a multiplicity of beds for growing plants hydroponically;

While the invention is susceptible of uses in a wide variety of different forms of pipe structures, it is particularly adaptable for use in laying out pipe systems for physically supporting numerous individual pot shaped beds containing aggregate or like material for growing plants therein, and for periodically flooding the beds with mineral containing water and then draining away the water, such as that shown and described in my U.S. Patent No. 3,053,011.

Figure 1:
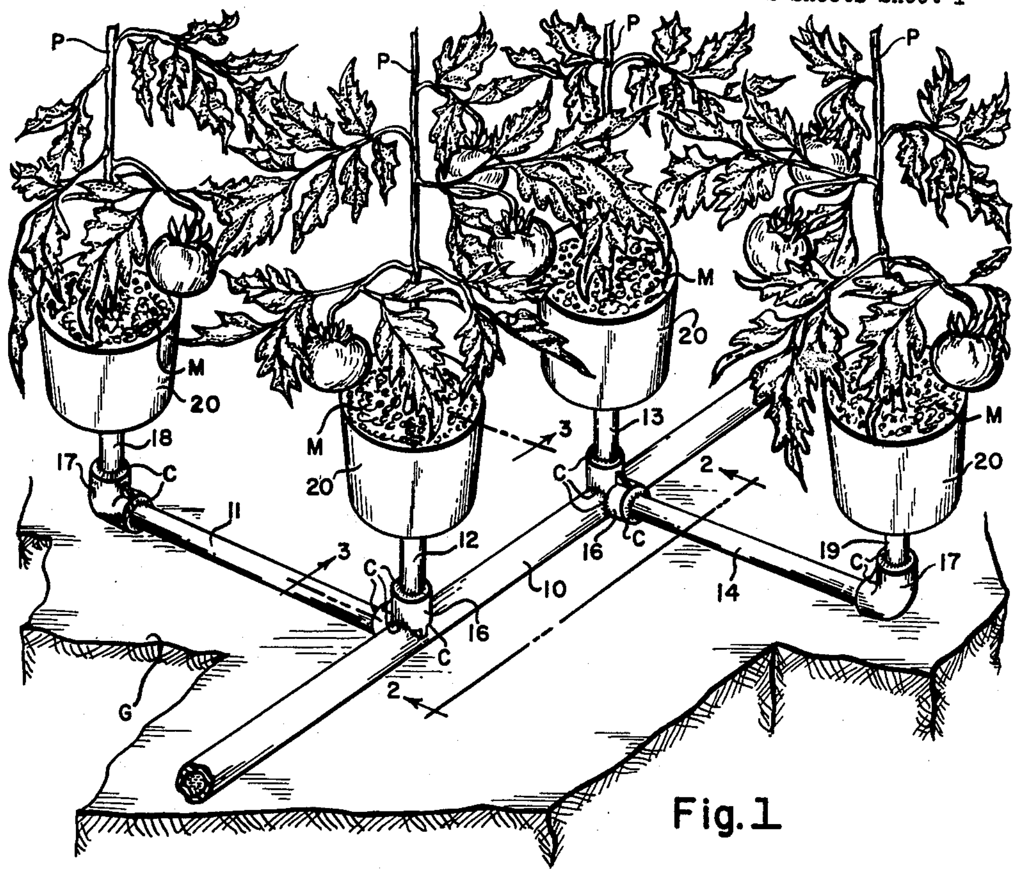
Figure 2:
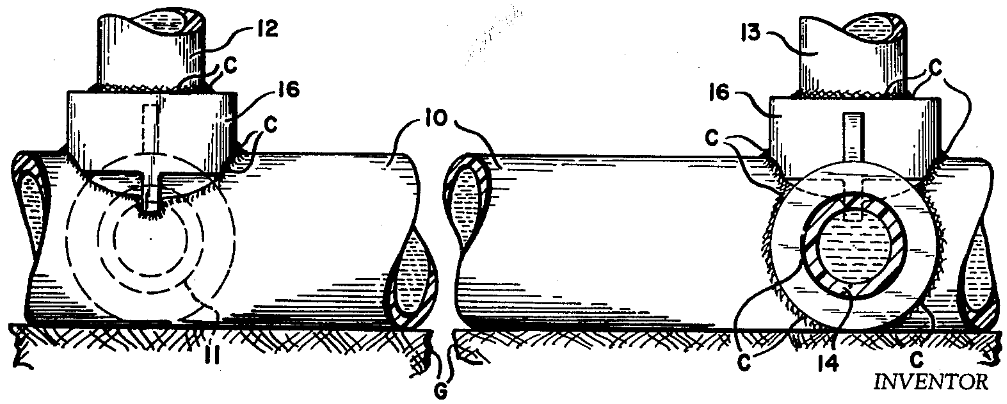
FIG. 2 is a fragmentary sectional view taken along line 2—2 of FIG. 1 but on a larger scale.

Referring to FIG. 1, a fragment of a hydroponic growing system of the type mentioned is shown comprising a main pipe section 10 having branch pipes 11, 12, 13 and 14 attached thereto. The pipes in the system shown are preferably formed of polyvinyl chloride which is inert to the water and chemicals employed in the process mentioned and furthermore, provides light weight and easily handled material. For economy and ease of handling, the walls of pipe 10 are relatively thin and cannot offer sufficient body to provide a strong joint with the branch pipes, and according to the present invention a convenient and highly satisfactory joint with each branch pipe is effected by connector member 16 which is preferably formed of molded polyvinyl chloride and provides relatively heavy, sturdy ring-like sections cemented to the walls of pipe 10 and which sections receive and support the inner ends of the branch pipes. Branch pipes 11 and 14 project laterally of main pipe 10 while pipes 12 and 13 extend vertically therefrom. In the form of growing bed structure shown, branch pipes 11 and 14 extend parallel to the ground G on which the bed structure rests and their outer ends have suitable elbows 17 which support vertically extending pipe sections 18 and 19, respectively, which are like branch pipes 12 and 13. Pipes 12, 13, 18 and 19 each support a growing bed 20 which is pot shaped and is preferably formed of polyvinyl chloride. Each bed 20 has a sleeve structure **20*a* on the bottom thereof for receiving the upper end of a pipe section, such as section 12**, etc., which supports the bed thereby and also directs chemical bearing water into and drains the water therefrom. The beds contain a suitable granular material M, such as pebbles or vermiculite, in which plants P are rooted.

Figure 4:
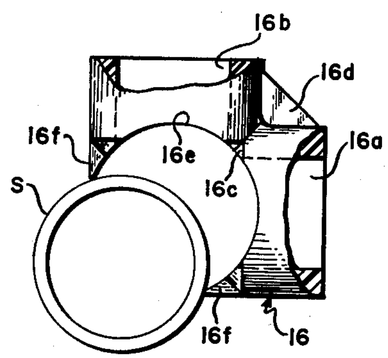
FIGS. 4, 5 and 6 are sectional views of an improved connector member forming a part of the growing system illustrating the manner in which it is applied to a section of pipe.
Figure 3:
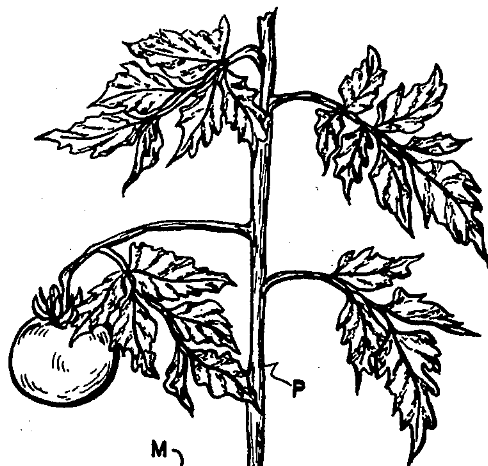
FIG. 3 is a sectional view taken substantially along line 3—3 of FIG. 1 but on a larger scale.
Figure 5:
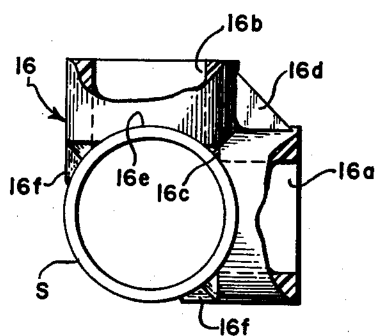
Figure 6:
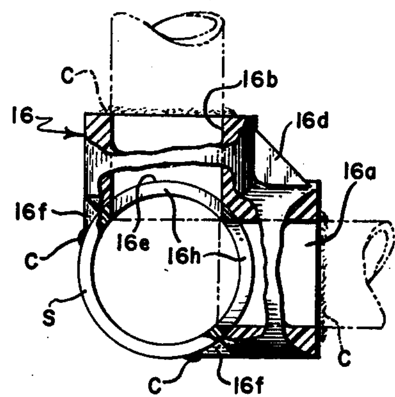

Referring more specifically to FIGS. 4, 5 and 6, wherein a connector member 16 is shown being applied to pipe section S which is like pipe 10, the connector comprises two ring-like sections **16*a* and 16*b* which are disposed with their axes in a common plane and are at a 90° angle to one another. These ring-like sections are attached to one another by a common wall portion indicated at 16*c* and by a connector web 16*d*. The outer and upper faces of ring sections 16*a* and 16*b* respectively lie in flat planes while the inner surfaces are in the form of a semi-cylindrical section 16*e* the diameter of which corresponds to the outside diameter of pipe S. The semi-cylindrical section 16*e* extends slightly more than 180°, and tab-like portions 16*f* project beyond the 180° arc of the section and form holding jaws for retaining the connector to the pipe S, as seen in FIG. 5. As mentioned previously, member 16 is formed of resilient plastic material so that jaws 16*f* can be spread whereby semi-cylindrical section 16*e* is yieldingly distorted to receive pipe S. In applying member 16 to pipe section S, it is only necessary to place the open side of semi-cylindrical section 16*e* against the pipe section and press the member to the section, the curvature of the walls of the pipe section acting to cam jaws 16*f* apart to receive the pipe section. Thereafter, the resiliency of the material from which member 16** is formed, frictionally holds the member to the pipe.

After the member 16 has been placed on the pipe as described, a suitable cement C is applied about the edges thereof to firmly secure the connector in place on the pipe. Holes **16*h* may then be drilled through the walls of pipe S by inserting a drill through ring sections 16*a* and 16*b* to provide passages through the pipe walls to the interiors of the ring sections. It will be appreciated that by this arrangement the connectors 16 can be attached to a main feed pipe, such as 10**, at any convenient point without pre-forming holes in the pipe and without cutting or otherwise altering the pipe until the connector is in place. Furthermore, the resiliency of the connector is such that while it is normally fractionally retained in position on the main pipe, it can be forcibly slid along the pipe to the exact position desired and then fixed to the pipe as described.

While but one form of the invention has been described in detail, it is to be understood that other forms, modifications and adaptations could be made, all falling within the scope and claim which follows.

I claim:

A branch pipe connector attachable to a cylindrical main pipe and comprising a first cylindrical branch pipe receiving section disposed normal to said main pipe section and having one end surface curved for following and engaging the cylindrical surface of said main pipe section, a second cylindrical branch pipe receiving section disposed normal to said main pipe section and extending 90° with respect to said first branch pipe receiving section and having one end surface curved for following and engaging a cylindrical surface of said main pipe section adjacent to the first mentioned cylindrical surface thereof, said first and second branch pipe receiving sections being formed of synthetic plastic material which readily returns to its original form following deformation thereof and having adjacent side portions merging to form a yieldable hinge portion between said branch pipe receiving sections, said curved end surfaces of said branch pipe receiving sections lying in a continuous arc extending slightly greater than 180° to thereby encompas more than 180° of said main pipe section and such that said outer ends of said curved ends may be yieldingly separated by flexing of said hinge portion to receive said main pipe section within said curved ends with said branch pipe receiving sections normal to said main pipe section, the resiliency of said material forming said branch pipe receiving sections causing said curved end surfaces to embrace said main pipe section.

References Cited in the file of this patent

UNITED STATES PATENTS

| | | |
|---|---|---|
| 1,389,224 | Sheppy | Aug. 30, 1921 |
| 1,568,510 | Kwasigroch | Jan. 5, 1926 |
| 1,908,821 | Cornell | May 16, 1933 |
| 2,705,162 | Linsky | Mar. 29, 1955 |
| 2,736,335 | Webber | Feb. 28, 1956 |
| 2,839,320 | Hill | June 17, 1958 |
| 2,966,372 | Phillips | Dec. 27, 1960 |

FOREIGN PATENTS

| | | |
|---|---|---|
| 207,952 | Australia | May 14, 1957 |